United States Patent [19]
Garrett

[11] Patent Number: 5,451,330
[45] Date of Patent: Sep. 19, 1995

[54] SUCTION SKIMMER

[75] Inventor: Gary C. Garrett, Edmond, Okla.

[73] Assignee: Advanced Waste Reduction, Inc., Edmond, Okla.

[21] Appl. No.: 230,575

[22] Filed: Apr. 21, 1994

[51] Int. Cl.6 .............................................. C02F 1/40
[52] U.S. Cl. ................. 210/776; 210/242.3; 210/540
[58] Field of Search .......... 210/776, 800, 242.3, 210/513, 540, 532.1, 923

[56] References Cited

U.S. PATENT DOCUMENTS

| | | | |
|---|---|---|---|
| 306,169 | 10/1884 | Moseley | 210/540 |
| 2,242,139 | 5/1941 | Munroe | 210/540 |
| 3,675,771 | 7/1972 | McKee | 210/242.3 |
| 3,702,134 | 11/1972 | Henning, Jr. et al. | 210/242.3 |
| 4,892,666 | 1/1990 | Paulson | 210/540 |
| 5,104,528 | 4/1992 | Christie | 210/540 |
| 5,118,412 | 6/1992 | Schmidt | 210/242.3 |

Primary Examiner—Christopher Upton
Attorney, Agent, or Firm—Dunlap & Codding

[57] ABSTRACT

A suction skimmer for removing an upper portion of a liquid from a vessel under substantially laminar flow conditions which includes a body member having a fluid flow passageway extending therethrough and at least one slot formed in an upper portion of the body member which openly communicates with the fluid flow passageway. The suction skimmer also includes a throttle assembly for varying the length of the slot in the body member.

20 Claims, 1 Drawing Sheet

SUCTION SKIMMER

FIELD OF THE INVENTION

The present invention relates generally to skimmer systems and, more particularly, but not by way of limitation, to a suction skimmer for separating a hydrocarbon layer from an aqueous medium.

DESCRIPTION OF THE PREFERRED EMBODIMENTS

Figure 1:
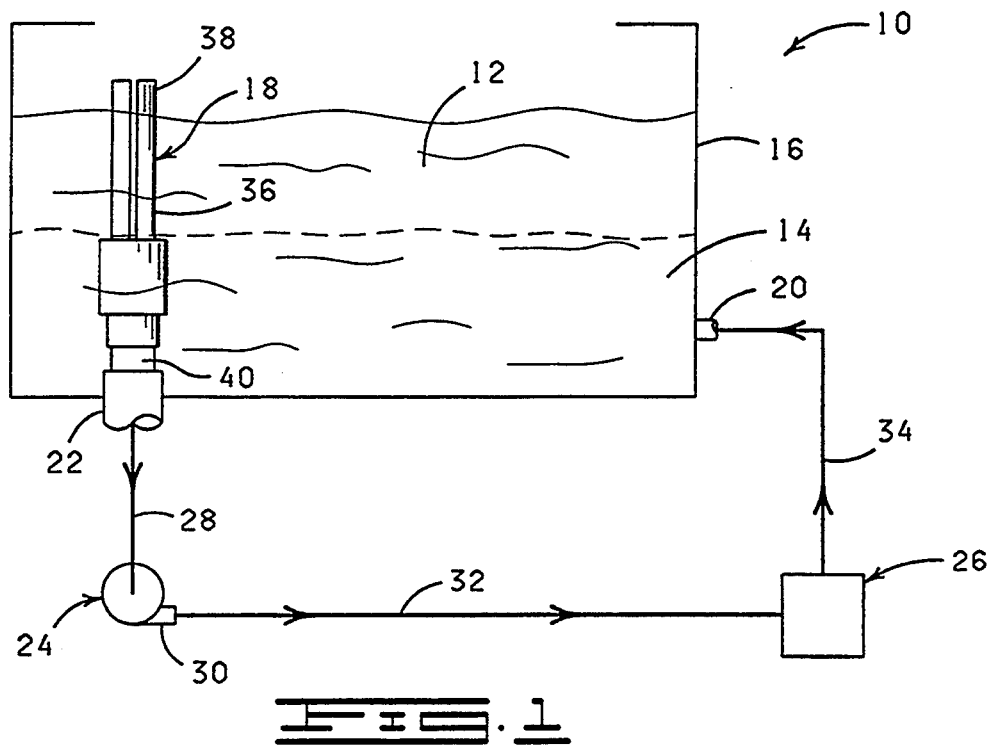
FIG. 1 is a diagrammatic view of a skimmer system utilizing a suction skimmer constructed in accordance with the present invention.

Shown in FIG. 1 is a fluid processing system 10 for selectively withdrawing an upper layer or portion 12 of a liquid 14 from a vessel 16 which includes a suction skimmer 18 constructed and operated in accordance with the present invention. The vessel 16 is provided with a fluid inlet 20 and a fluid outlet 22. The processing system 10 further includes a pump 24 and an effluent separation or purification system 26.

The suction skimmer 18 is disposed within vessel 16 substantially as shown and connected to the fluid outlet 22 so that fluid communication is established therebetween. The fluid outlet 22 is also connected to the suction port (not shown) of the pump 24 via conduit 28 and the discharge port 30 of the pump 24 is connected to the effluent separation or purification system 26 via conduit 32. The effluent separation or purification system 26 is then connected to the fluid inlet 20 of the vessel 16 via conduit 34.

When the liquid 14 becomes contaminated with hydrocarbon, non-emulsified oils and/or metal particles, the pump 24 is actuated so that the upper layer 12 of the liquid 14 is withdrawn from the vessel 16 under laminar flow conditions via the suction skimmer 18 and passed to the effluent separation or purification system 26 via the fluid outlet 22 of the vessel 16, the conduit 28, the pump 24 and the conduit 32. After the contaminants have been removed from the liquid 14 by the effluent separation or purification system 26, the treated liquid, substantially free of contaminants, is passed to the vessel 16 via the conduit 34 and the fluid inlet 20 of the vessel 16.

The liquid 14 can be a lubricant such as is used in a milling or drilling machine, or an aqueous solution containing a surfactant such as is used in a parts washer. Thus, the nature and type of effluent separation or purification system employed will be dependent upon the nature of the liquid 14 in the vessel 16, as well as the contaminants contained in the liquid.

As will be described in more detail hereinafter, the design and operation of the suction skimmer 18 permits the upper layer 12 of the liquid 14 contained in the vessel 16 to be removed under substantially laminar flow conditions while providing substantially vortical flow of the removed portion of the upper layer 12 through at least a portion of the suction skimmer 18.

The suction skimmer 18 includes an elongated body member 36 having a first end 38, a second end 40 and a fluid flow passageway 42 (FIG. 2) extending therebetween. The second end 40 of the body member 36 is connected to a bulkhead connection (not shown) of the vessel 16 so that body member 36 is substantially vertically disposed and the first end 38 of the body member 36 extends a distance above the upper layer 12 of the liquid 14 substantially as shown in FIG. 1.

The second end 40 of the body member 36 can be connected to the bulkhead connection of the vessel 16 by any conventional means as long as a fluid-tight connection is formed between the second end 40 of the body member 36 and the bulkhead connection, while maintaining fluid communication between the fluid flow passageway 42 of the body member 36 and the fluid outlet 22 of the vessel 16. For example, the second end 40 of the body member 36 may be provided with externally disposed threads which are adapted to matingly engage internally disposed threads (not shown) in the bulkhead connection.

Figure 2:
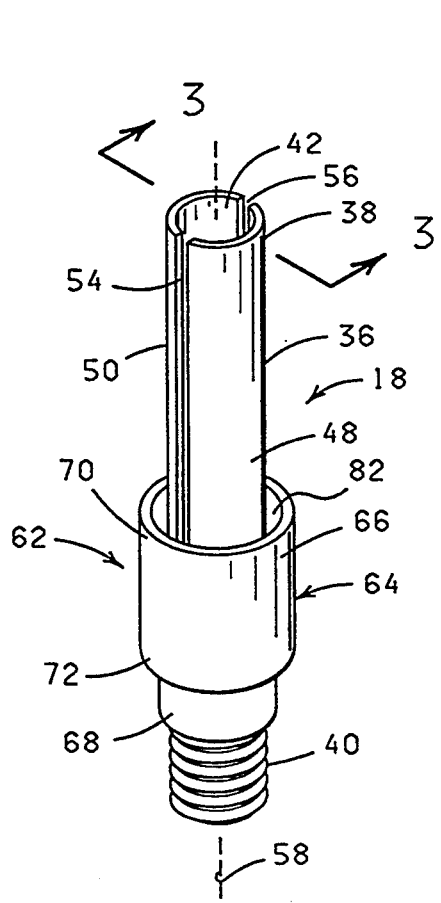
FIG. 2 is a perspective view of the suction skimmer of the present invention.
Figure 3:
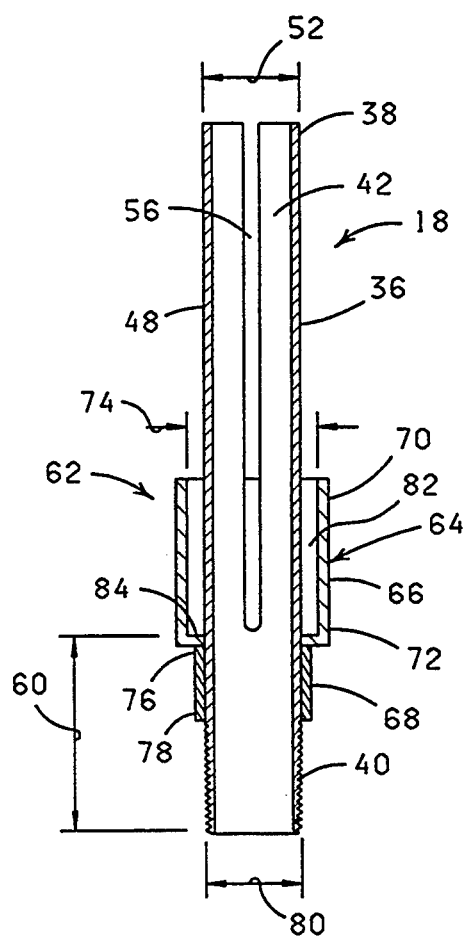
FIG. 3 is a cross sectional view of the suction skimmer taken at lines 3—3 of FIG. 2.

Referring now to FIGS. 2 and 3, the body member 36 is provided with a continuous side wall 48 having an outer peripheral surface 50 and an outside diameter 52. A plurality of spatially disposed slots, such as slots 54 and 56, are formed through the continuous side wall 48 of the body member 36 so as to openly communicate with the fluid flow passageway 42 of the body member 36. The slots 54 and 56, which are disposed substantially parallel to an elongated axis 58 of the body member 36, extend from the first end 38 of the body member 36 and terminate a distance 60 (Fig.3) from the second end 40 of the body member 36.

The suction skimmer 18 further includes a throttle assembly 62 supported on the body member 36 for varying the length of the slots 54 and 56 to regulate the flow of fluid therethrough and to insure that laminar flow of fluid is maintained as the upper layer 12 of the liquid 14 is drawn into the fluid flow passageway 42 of the body member 36 through the slots 54 and 56. The throttle assembly 62 comprises a sleeve member 64 disposed about the peripheral surface 50 of the body member 36 and slidably movable thereon for varying the length of the slots 54 and 56 formed through the continuous side wall 48 of the body member 36. The sleeve member 64 is provided with an upper sleeve portion 66 and a lower sleeve portion 68. The upper sleeve portion 66 of the sleeve member 64 has a first end 70, a second end 72 and an inside diameter 74; and the lower sleeve portion 68 of the sleeve member 64 has a first end 76, a second end 78 and an inside diameter 80. The inside diameter 74 of the upper sleeve portion 66 of the sleeve member 64 is greater than the outside diameter 52 of the body member 36 so that an annulus 82 is formed between the upper sleeve portion 66 and an adjacently disposed portion of the body member 36; whereas, the inside diameter 80 of the lower sleeve portion 68 substantially corresponds to the outside diameter 52 of the body member 36 so that the lower sleeve portion 68 can be fictionally supported on the body member 36.

The first end 76 of the lower sleeve portion 68 is connected to the second end 72 of the upper sleeve portion 66 so as to define a closed lower end 84 of the annulus 82. The lower sleeve portion 68 is disposed about the outer peripheral surface 50 of the body member 36 and frictionally engages the outer peripheral surface 50 of the body member 36 so that the sleeve member 64 can be disposed in a desired position on the body member 36 while permitting the sleeve member 64 to be slidably moved along the body member 36 to vary the length of the slots 54 and 56.

The suction skimmer 18, as well as the components thereof, can be constructed of any suitable material having sufficient rigidity and which is inert and stable in the environment in which the suction skimmer 18 is used. For example, depending upon the nature of the liquid to which the suction skimmer is exposed, the suction skimmer may be fabricated of either metal or plastic.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A suction skimmer for removing an upper layer of liquid from a vessel, comprising:
   a body member having a first end, a second end, a fluid flow passageway extending through at least a portion of the body member in open communication with the second end of the body member, and at least one slot extending along a portion of the body member in open communication with the fluid flow passageway; and
   throttle means supported by the body member for varying the length of the slot in the body member so as to provide substantially laminar flow of liquid through the slot and into the fluid flow passageway of the body member for passage therethrough.

2. The suction skimmer of claim 1 wherein the throttle means comprises:
   a sleeve member disposed on the body member so as to be slidably movable thereon for varying the length of the slot in the body member.

3. The suction skimmer of claim 1 wherein the body member is an elongated body member having an outer peripheral surface and wherein the throttle means comprises;
   a sleeve member disposed about the outer peripheral surface of the elongated body member so as to be slidably movable thereon for varying the length of the slot in the elongated body member, the sleeve member comprising an upper sleeve portion and a lower sleeve portion, the upper sleeve portion having a first end and a second end, the upper sleeve portion disposed a distance from the outer peripheral surface of the elongated body member so that the upper sleeve portion cooperates with an adjacently disposed portion of the outer peripheral surface of the elongated body member to form an annulus therebetween, the lower sleeve portion having a first end and a second end, the first end of the lower sleeve portion connected to the second end of the upper sleeve portion so as to define a closed lower end of the annulus, the lower sleeve portion disposed about the outer peripheral surface of the elongated body member and frictionally engaging the elongated body member so that the sleeve member can be disposed in a desired position on the elongated body member while permitting the sleeve member to be slidably moved along the elongated body member to vary the length of the slot in the elongated body member.

4. A suction skimmer connectable to an outlet of a vessel for removing an upper layer of liquid from the vessel wherein the vessel is provided with an outlet for removing liquids from the vessel, the suction skimmer comprising:
   an elongated body member having a first end, a second end, a fluid flow passageway extending through at least a portion of the body member in open communication with the second end of the body member and a plurality of spatially disposed elongated slots extending from the first end of the elongated body member and terminating a distance from the second end thereof, the elongated slots in open communication with the fluid flow passageway, the second end of the elongated body member provided with means for connecting the second end of the elongated body member to an outlet of a vessel such that in a connected condition a fluid-tight connection is formed therebetween and the first end of the elongated body member and a portion of the elongated slots in the elongated body member are disposed a distance above the liquid in the vessel; and
   throttle means supported by the elongated body member for varying the length of the elongated slots in the elongated body member and thereby maintain substantially laminar flow of liquid through the elongated slots of the body member.

5. The suction skimmer of claim 4 wherein the throttle means comprises:
   a sleeve member slidably disposed on the elongated body member for varying the length of the longitudinally extending slots in the elongated body member.

6. The suction skimmer of claim 4 wherein the elongated body member is provided with a substantially circular shaped cross section and has a peripheral surface and wherein the throttle means comprises;
   a sleeve member disposed about the peripheral surface of the elongated body member so as to be slidably movable thereon for varying the length of the slots, the sleeve member comprising an upper sleeve portion and a lower sleeve portion, the upper sleeve portion having a first end and a second end, the upper sleeve portion disposed a distance from the peripheral surface of the elongated member so that the upper sleeve portion cooperates with an adjacently disposed portion of the peripheral surface of the elongated body member to form an annulus therebetween, the lower sleeve portion having a first end and a second end, the first end of the lower sleeve portion connected to the second end of the upper sleeve portion so as to define a closed lower end of the annulus, the lower sleeve portion disposed about the peripheral surface of the elongated body member and frictionally engaging the elongated body member so that the sleeve member can be disposed in a desired position on the elongated body member while permitting the sleeve member to be slidably moved along the elongated body member to vary the length of the slots in the elongated body member.

7. (New) A suction skimmer for removing an upper layer of liquid from a vessel, comprising:
   a substantially cylindrically shaped elongated body member having a first end, a second end, a fluid flow passageway extending through at least a portion of the body member in open communication with the second end of the body member, the elongated body member further characterized as having an elongated axis extending from the first end to the second end, an outer peripheral surface and a plurality of the slots spatially disposed in the elongated body member in open communication with the fluid flow passageway, each of the slots being disposed substantially parallel to the elongated axis of the elongated body member so as to extend from the first end of the elongated body member and terminate a distance from the second end thereof; and throttle means supported by the elongated body member for varying the length of the slots in the elongated body member and thereby control the flow rate of liquid through the slots and into the fluid flow passageway of the elongated body member so as to provide substantially laminar flow of liquid through the slots and into the fluid flow passageway.

8. The suction skimmer of claim 7 wherein the throttle means comprises:

a sleeve member disposed on the outer peripheral surface of the substantially cylindrically shaped elongated body member so as to be slidably movable thereon for varying the length of the slots in the substantially cylindrically shaped elongated body member.

9. The suction skimmer of claim 8 wherein the sleeve member is provided with an upper sleeve portion and a lower sleeve portion, the upper sleeve portion having a first end and a second end, the upper sleeve portion disposed a distance from the outer peripheral surface of the substantially cylindrically shaped elongated body member so that the upper sleeve portion cooperates with an adjacently disposed portion of the outer peripheral surface of the substantially cylindrically shaped elongated body member to form an annulus therebetween, the lower sleeve portion having a first end and a second end, the first end of the lower sleeve portion connected to the second end of the upper sleeve portion so as to define a closed lower end of the annulus, the lower sleeve portion disposed about the outer peripheral surface of the substantially cylindrically shaped elongated body member and frictionally engaging the substantially cylindrically shaped elongated body member so that the sleeve member can be disposed in a desired position on the substantially cylindrically shaped elongated body member while permitting the sleeve member to be slidably moved along the outer peripheral surface of the substantially cylindrically shaped elongated body member to vary the length of the slots in the substantially cylindrically shaped elongated body member.

10. A suction skimmer for separating a non-emulsified hydrocarbon layer from an aqueous solution in a vessel for discharge of the separated non-emulsified hydrocarbon layer from the vessel via a fluid outlet of the vessel, the vessel having a pump operably connected to the fluid outlet of the vessel, the suction skimmer comprising:

a body member having a first end, a second end, a fluid flow passageway extending through at least a portion of the body member in open communication with the second end of the body member, and at least one slot extending along a portion of the body member in open communication with the fluid flow passageway so as to provide substantially laminar flow of liquid through the slot and into the fluid flow passageway while providing vortical flow of liquid along a substantial portion of the fluid flow passageway, the second end of the body member connectable to the vessel so that fluid communication is provided between the fluid flow passageway of the body member and the outlet of the vessel and so that the body member is substantially vertically disposed whereby non-emulsified hydrocarbons entering the fluid flow passageway of the body member via the slot in the body member is discharged from the vessel via the outlet thereof by activation of the pump; and throttle means supported by the body member for varying the length of the slot so as to maintain substantially laminar flow of non-emulsified hydrocarbon through the slot and into the fluid flow passageway of the body member.

11. The suction skimmer of claim 6 wherein the throttle means comprises:

a sleeve member disposed on the body member so as to be slidably movable thereon for varying the length of the slot in the body member.

12. The suction skimmer of claim 10 wherein the body member is a substantially cylindrically shaped body member having an outer peripheral surface and wherein the throttle means comprises:

a sleeve member disposed about the outer peripheral surface of the substantially cylindrically shaped body member so as to be slidably movable thereon for varying the length of the slot in the substantially cylindrically shaped body member, the sleeve member comprising an upper sleeve portion and a lower sleeve portion, the upper sleeve portion having a first end and a second end, the upper sleeve portion disposed a distance from the outer peripheral surface of the substantially cylindrically shaped body member so that the upper sleeve portion cooperates with an adjacently disposed portion of the outer peripheral surface of the substantially cylindrically shaped body member to form an annulus therebetween, the lower sleeve portion having a first end and a second end, the first end of the lower sleeve portion connected to the second end of the upper sleeve portion so as to define a closed lower end of the annulus, the lower sleeve portion disposed about the outer peripheral surface of the substantially cylindrically shaped body member and frictionally engaging a portion of the substantially cylindrically shaped body member so that the sleeve member can be disposed in a desired position on the substantially cylindrically shaped body member while permitting the sleeve member to be slidably moved along the substantially cylindrically shaped body member to vary the length of the slot in the substantially cylindrically shaped body member.

13. A suction skimmer for separating a non-emulsified hydrocarbon layer from an aqueous solution in a vessel for discharge of the separated non-emulsified hydrocarbon layer from the vessel through a fluid outlet of the vessel upon activation of a pump operably connected to the fluid outlet of the vessel, the suction skimmer comprising:

an elongated body member having a first end, a second end, a fluid flow passageway extending through at lesat a portion of the body member in open communication with the second end of the body member and a plurality of spatially disposed elongated slots extending from the first end of the elongated body member and terminating a distance from the second end thereof, the elongated slots in open communication with the fluid flow passageway, and wherein the elongated body member further comprises means for connecting the second end of the elongated body member to the vessel such that, in a connected position, fluid communication is provided between the fluid flow passageway of the elongated body member and the fluid outlet of the vessel and the elongated body member is substantially vertically disposed so that the first end of the elongated body member and a portion of the slots in the elongated body member are disposed a distance above the non-emulsified hydrocarbon in the vessel and provide substantially laminar flow of the non-emulsified hydrocarbon through the slots and into the fluid flow passageway of the elongated body member while providing vortical flow of the non-emulsified hydrocarbon along a substantial portion of the fluid flow passageway whereby the non-emulsified hydrocarbon entering the fluid flow passageway of the elongated body member via the slots is dischargeable from the outlet of the vessel upon activation of the pump; and throttle means supported by the elongated body member for varying the length of the slots and thereby maintain substantially laminar flow of non-emulsified hydrocarbon through the slots and into the fluid flow passageway of the elongated body member.

14. The suction skimmer of claim 13 wherein the throttle means comprises:

a sleeve member disposed on the elongated body member so as to be slidably movable thereon for varying the length of the slots in the elongated body member.

15. The suction skimmer of claim 13 wherein the elongated body member is provided with a substantially circular shaped cross section and has an outer peripheral surface and wherein the throttle means comprises;

a sleeve member disposed about the peripheral surface of the elongated body member so as to be slidably movable thereon for varying the length of the slots in the elongated body member, the sleeve member comprising an upper sleeve portion and a lower sleeve portion, the upper sleeve portion having a first end and a second end, the upper sleeve portion disposed a distance from the outer peripheral surface of the elongated body member so that the upper sleeve portion cooperates with an adjacently disposed portion of the outer peripheral surface of the elongated body member to form an annulus therebetween, the lower sleeve portion having a first end and a second end, the first end of the lower sleeve portion connected to the second end of the upper sleeve portion so as to define a closed lower end of the annulus, the lower sleeve portion disposed about the outer peripheral surface of the elongated body member and frictionally engaging the elongated body member so that the sleeve member can be disposed in a desired position on the elongated body member while permitting the sleeve member to be slidably moved along the elongated body member to vary the length of the slots in the elongated body member.

16. A suction skimmer for separating a non-emulsified hydrocarbon layer from an aqueous solution in a vessel wherein the vessel is provided with a fluid outlet and a pump for removing liquid from the vessel, the suction skimmer comprising:

a substantially cylindrically shaped elongated body member having a first end, a second end, an elongated axis extending from the first end to the second end, an outer peripheral surface, a fluid flow passageway extending through at least a portion of the substantially cylindrically shaped elongated body member in open communication with the second end of the substantially cylindrically shaped elongated body member, and a plurality of elongated slots spatially disposed in the substantially cylindrically shaped elongated body member in open communication with the fluid flow passageway in the substantially cylindrically shaped elongated body member so as to provide substantially laminar flow of liquid through the elongated slots and into the fluid flow passageway while providing vortical flow of liquid along a substantial portion of the fluid flow passageway, each of the elongated slots being disposed substantially parallel to the elongated axis of the substantially cylindrically shaped elongated member and extending from the first end of the substantially cylindrically shaped elongated body member and terminating a distance from the second end thereof, the second end of the body member connectable to the vessel so that fluid communication is provided between the fluid flow passageway of the substantially cylindrically shaped elongated body member and the fluid outlet of the vessel and so that the substantially cylindrically shaped elongated body member is substantially vertically disposed in the vessel and liquid entering the fluid flow passageway of the substantially cylindrically shaped elongated body member is dischargeable therefrom by activation of a pump; and throttle means supported by the substantially cylindrically shaped elongated body member for varying the length of the elongated slots and thereby controlling the flow rate of liquid through the fluid flow passageway of the substantially cylindrically shaped elongated body member so as to maintain substantially laminar flow of the liquid through the elongated slots and into the fluid flow passageway of the substantially cylindrically shaped elongated body member.

17. The suction skimmer of claim 16 wherein the throttle means comprises:

a sleeve member disposed on the outer peripheral surface of the substantially cylindrically shaped body member so as to be slidably movable thereon for varying the length of the slots in the substantially cylindrically shaped body member.

18. The suction skimmer of claim 17 wherein the sleeve member is provided with an upper sleeve portion and a lower sleeve portion, the upper sleeve portion having a first end and a second end, the upper sleeve portion disposed a distance from the outer peripheral surface of the substantially cylindrically shaped elongated body member so that the upper sleeve portion cooperates with an adjacently disposed portion of the outer peripheral surface of the substantially cylindrically shaped elongated body member to form an annulus therebetween, the lower sleeve portion having a first end and a second end, the first end of the lower sleeve portion connected to the second end of the upper sleeve portion so as to define a closed lower end of the annulus, the lower sleeve portion disposed about the outer peripheral surface of the substantially cylindrically shaped elongated body member and frictionally engaging the substantially cylindrically shaped elongated body member so that the sleeve member can be disposed in a desired position on the substantially cylindrically shaped elongated body member while permitting the sleeve member to be slidably moved along the outer peripheral surface of the substantially cylindrically shaped elongated body member to vary the length of the slots in the substantially cylindrically shaped elongated body member.

19. A method for separating a non-emulsified oil layer from an aqueous layer in a vessel for discharge from the vessel via a fluid outlet of the vessel, the method comprising:

providing a skimmer comprising a body member having a first end, a second end, a fluid flow passageway extending through at least a portion of the body member in open communication with the second end of the body member, and at least one slot formed in the body member and extending a selected distance from the first end toward the second end such that the slot openly communicates with the fluid flow passageway, the slot being characterized as having an upper portion and a lower portion;

connecting the first end of the body member to the vessel such that the fluid flow passageway of the body member is in fluid communication with the outlet of the vessel and the first end of the body member and the upper portion of the slot formed therein are disposed a distance above the non-emulsified oil layer in the vessel and the lower portion of the slot is disposed within the non-emulsified oil layer in the vessel;

withdrawing non-emulsified oil from the vessel by passing the non-emulsified oil through the slot of the body member and through the fluid flow passageway of the body member and the outlet of the vessel; and varying the length of the slot in the body member so to provide substantially laminar flow of non-emulsified oil into the slot for passage through the fluid flow passageway of the body member.

20. A method for separating an upper hydrocarbon layer from an aqueous solution in a vessel wherein the vessel is provided with a fluid outlet in a lower portion thereof, the method comprising:

providing a skimmer comprising a substantially cylindrically shaped elongated body member having a open first end, an open second end and a fluid flow passageway extending therebetween, the substantially cylindrically shaped elongated body member further characterized as having a continuous sidewall with a plurality of spatially disposed elongated slots formed therethrough which openly communicate with a portion of the fluid flow passageway, the elongated slots extending from the open first end of the substantially cylindrically shaped elongated body member and terminating a distance from the open second end of the substantially cylindrically shaped elongated body member, each of the slots being an elongated slot having an upper portion and a lower portion;

connecting the first end of the substantially cylindrically shaped elongated body member to the vessel so that the fluid flow passageway of the substantially cylindrically shaped elongated body member is in fluid communication with the outlet of the vessel and the first end of the body member and the upper portion of each of the elongated slots formed in the continuous sidewall of the substantially cylindrically shaped elongated body member are disposed a distance above the upper hydrocarbon layer in the vessel and the lower portion of each of the elongated slots is in contact with at least the hydrocarbon layer in the vessel;

withdrawing hydrocarbon from the vessel by passing the hydrocarbon through the lower portion of the elongated slots of the substantially cylindrically shaped elongated body member for passage through the fluid flow passageway of the substantially cylindrically shaped elongated body member and the outlet of the vessel; and varying the length of the elongated slots formed in the continuous sidewall of the substantially cylindrically shaped elongated body member so as to provide substantially laminar flow of hydrocarbon through the lower portions of the slots and into the fluid flow passageway of the substantially cylindrically shaped elongated body member while providing a vortical flow of hydrocarbon along the fluid flow passageway of the substantially cylindrically shaped elongated body member.

* * * * *

UNITED STATES PATENT AND TRADEMARK OFFICE
CERTIFICATE OF CORRECTION

PATENT NO. : 5,451,330

DATED : September 19, 1995

INVENTOR(S) : Gary C. Garrett

It is certified that error appears in the above-identified patent and that said Letters Patent is hereby corrected as shown below:

Column 2, Line 57, please delete "fictionally" and substitute therefore --frictionally--.

Column 3, Line 41, after prises, please delete ";" and substitute therefore --:--.

Column 4, Line 61; after 7., please delete "(NEW)".

Column 5, Line 3; after of, please delete "the".

Column 6, Line 65; after at, please delete "lesat" and substitute therefor --least--.

Column 10, line 4; after having, please delete "a" and substitute therefor --an--.

Signed and Sealed this

Thirteenth Day of February, 1996

*Attest:*

BRUCE LEHMAN

*Attesting Officer*  Commissioner of Patents and Trademarks